3,142,653
PLASTICIZED UREA-FORMALDEHYDE RESINS
Peter Blackman, Cranston, and John P. Conbere and Edward Mahlon Perry, Barrington, R.I., assignors to I.C.I./Organics/Inc., a corporation of Rhode Island
No Drawing. Filed Sept. 19, 1960, Ser. No. 56,655
11 Claims. (Cl. 260—31.8)

The present invention relates to plasticized urea- or melamine-formaldehyde resins and compositions containing the same.

The principal object of the invention is to provide novel urea- or melamine-formaldehyde resin compositions of improved plasticity. A more particular object of the invention is to provide such resin compositions which can be cured into flexible films and coatings having other desirable characteritics. Additional objects will also be hereinafter apparent.

Broadly stated, the objects of the invention are realized by the provision of a composition comprising urea-formaldehyde resin and/or melamine-formaldehyde resin, particularly in water-soluble prepolymer form, and as a plasticizer for the resin, an effective amount of a compound selected from the group consisting of compounds having the formula:

$$(ROCHCH_2)_2N(CH_2)_2-\left[\begin{array}{c}-N-CH_2CH_2-\\ \phantom{-}|\\ CH_2-CH-OR\\ \phantom{-}|\\ R'\end{array}\right]_x-N(CH_2CH-OR)_2$$
<br/>
with R' groups as indicated and compounds having the formula:

$$(ROCHCH_2)_2N(CH_2)_yN(CH_2CHOR)_2$$
with R' substituents wherein R is an aliphatic acyl radical from acetyl to isobutyryl, either straight or branched chain (i.e. R stands for R″CO— where R″ is an alkyl radical containing from one to three carbon atoms); R' is selected from the group consisting of hydrogen and lower alkyl, especially methyl; $y$ has a value from 2 to 6 and $x$ has a value from 1 to 3.

Typically suitable plasticizers for use herein are the following:

(I)
$$(CH_3COCH_2CH_2)_2N(CH_2)_2N(CH_2CH_2OCCH_3)_2$$
N,N,N',N'-tetrakis (2-hyroxyethyl) ethylenediamine tetracetate (II)
$$(CH_3COCH_2CH_2)N(CH_2)_6N(CH_2CH_2OCCH_3)_2$$
N,N,N',N'-tetrakis (2-hydroxyethyl)1,6-hexanediamine tetracetate (III)
$$(CH_3CH_2COCH_2CH_2)_2N(CH_2)_2N(CH_2CH_2OCCH_2CH_3)_2$$
N,N,N',N'-tetrakis (2-hydroxyethyl) ethylenediamine tetrapropionate (IV)
$$(CH_3CH_2CH_2COCH_2CH_2)_2N(CH_2)_2N(CH_2CH_2OCCH_2CH_2CH_3)_2$$
N,N,N',N'-tetrakis (2-hydroxyethyl)ethylenediamine tetrabutyrate (V)
$$CH_3CHCH_2COCH_2CH_2)_2N(CH_2)_2N(CH_2CH_3OCCH_2CHCH_3)_2$$
<br/>with CH_3 branches
N,N,N',N'-tetrakis (2-hydroxyethyl)ethylenediamine tetraisobutyrate (VI)
$$(CH_3COCHCH_2)_2N(CH_2)_2N(CH_2CHOCCH_3)_2$$
with CH_3 branches
N,N,N',N'-tetrakis (2-hydroxypropyl) ethylenediamine tetracetate (VII)
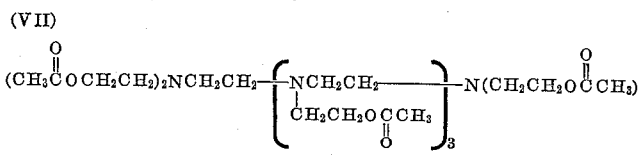

and similar compounds of the formula

wherein R and $x$ have any of the values stated above.

The plasticizers used herein may be prepared in conventional fashion by reacting the appropriate hydroxyalkyl alkylene polyamine, e.g. N,N,N',N'-tetrakis (2-hydroxyethyl)ethylene diamine, with an acylating agent such as acetic anhydride, propionic anhydride, ethyl butyrate or the like.

The urea-formaldehyde and melamine-formaldehyde resins used herein are desirably, but not necessarily, water-soluble prepolymers. These resins, modified to include one or more of the above mentioned plasticizers in accordance with the present invention, can be cured into highly desirable plasticized films or other products. Typically suitable curing conditions include heating at 120° to 160° C. for 10 to 60 minutes. If desired, an appropriate curing or polymerization catalyst, e.g., an aminol salt solution, may also be included in the plasticizer/resin mix.

The plasticizers used herein are unusually compatible with urea- and melamine-formaldehyde resins and are stable at normal curing temperatures. These plasticizers do not exude from the cured resin under normal conditions and they impart a desirable degree of flexibility to the cured compositions. This property of flexibility is unexpected since it is not usually associated with thermosetting resins.

Cured urea- and melamine-formaldehyde resins containing at least one plasticizer according to the invention may be either translucent or transparent. These resinous compositions may be elastic in some cases and they are also water-insoluble and water impervious. Accordingly, the compositions of the invention are particularly attractive for the formation of moisture protective films. Pigments may be incorporated in the plasticized resins and, if desired, the plasticized resin, with or without pigment, may be incorporated in paper, textiles or the like or used to provide surface coatings thereon. Paper containing the plasticized resin is not brittle, as is normally the case with, for example, the usual urea-formaldehyde resins. Paper coated with the plasticized resin mixture of the invention also has a high gloss surface which does not fracture on folding.

One unique and advantageous characteristic of the compositions of the invention is their suitability for use in an aqueous system to form films. Formation of protective films of urea-formaldehyde resins plasticized with alkyd resins is known, but these require organic media, such as xylene or butyl alcohol, which are undesirable. However, with the present invention, highly desirable films having the combined characteristics of flexibility and high gloss, may be formed by casting a water solution of, for example, prepolymeric urea-formaldehyde syrup and the plasticizer, followed by drying and baking or curing. The invention, therefore, eliminates the necessity of using a system based on organic solvents while at the same time providing a film of optimum characteristics.

The plasticizer used herein may be incorporated into the resin in any convenient fashion, desirably but not necessarily in aqueous solution. The resin which is used may have any degree of polymerization although, as indicated heretofore, it is preferably a heat-curable prepolymerized syrup. Usually, the plasticizer will comprise from 1 to 50% by weight of the final plasticized composition, desirably 10 to 20%.

As mentioned heretofore, pigments, typically titanium dioxide, may be added to the plasticized resin compositions of the invention. Usually, the pigment total will amount to from 1 to 20% by weight of the final composition although other proportions can be used. It will also be appreciated that other conventional ingredients may be included in the plasticized compositions of the invention.

The invention is illustrated, but not limited, by the following examples wherein parts and percentages are by weight unless otherwise stated. Of these examples, Examples 1–11 illustrate the preparation of various plasticizers contemplated for use herein while the remaining Examples 12–18 show the use of these plasticizers with urea-formaldehyde or melamine-formaldehyde resins according to the invention.

*Example 1*

This example shows the preparation of N,N,N',N'-tetrakis (2-hydroxyethyl) ethylenediamine tetraacetate for use in plasticizing urea-formaldehyde prepolymers.

A solution of 532 g. of N,N,N',N'-tetrakis-(2-hydroxyethyl)-ethylenediamine in benzene was treated slowly with 917 g. of acetic anhydride at 45–60° C. After the addition was complete, the material was heated at 100° C. for four hours and the excess acetic anhydride, acetic acid and benzene were distilled off under vacuum. The ester was washed with 800 cc. of water and 53 g. of sodium bicarbonate. It was then saturated with 250 g. of sodium chloride and cooled to about 0° C., and the water layer removed. 200 cc. of benzene was added and the last of the water azeotropically removed, and the benzene distilled off under vacuum. A viscous liquid resulted with active hydrogen analysis of 0.12.

*Example 2*

The procedure of Example 1 was repeated using propionic anhydride to yield N,N,N',N'-tetrakis (2-hydroxyethyl)ethylenediamine tetrapropionate, with an active hydrogen analysis of 0.17.

*Example 3*

The procedure of Example 1 was repeated using butyric anhydride to yield N,N,N',N'-tetrakis (2-hydroxyethyl)ethylenediamine tetrabutyrate, with an active hydrogen analysis of 0.14.

*Example 4*

The procedure of Example 1 was repeated using iso-butyric anhydride to yield N,N,N',N'-tetrakis (2-hydroxyethyl)ethylenediamine tetraisobutyrate, with an active hydrogen analysis of 0.18.

*Example 5*

A solution of 236 g. of N,N,N',N'-tetrakis-(2-hydroxyethyl)ethylenediamine and 580 g. of ethyl n-butyrate was heated to 120° C. and water azeotropically removed, using a fractionating column. It was then cooled to room temperature, and sodium methoxide catalyst added. The mixture was then heated to 151° C. over two hours while 238 cc. of ethanol was fractionally removed. The charge was cooled to room temperature, washed with a solution of sodium chloride, and excess water and ethyl n-butyrate distilled off under vacuum. The N,N,N',N'-tetrakis-(2 - hydroxyethyl)ethylenediamine tetrabutyrate had an active hydrogen analysis of 0.51.

*Example 6*

A solution of 162 g. of N,N,N',N",N"-penta-(2-hydroxyethyl)diethylenetriamine in benzene was treated with 352 cc. of acetic anhydride repeating the procedure in Example 1 to yield N,N,N',N",N"-penta(2-hydroxyethyl)diethylenetriamine pentaacetate.

*Example 7*

The procedure in Example 1 was repeated to produce N,N,N',N",N" - penta(2 - hydroxyethyl)diethylenetriamine pentapropionate.

*Example 8*

The procedure in Example 1 was repeated to produce N,N,N',N",N" - penta(2 - hydroxyethyl)diethylenetriamine pentabutyrate.

*Example 9*

A solution of 219 g. N,N,N',N'-tetrakis(2-hydroxyethyl)1,6-hexanediamine in benzene was treated with 459 g. of acetic anhydride repeating the procedure in Example 1 to yield N,N,N',N'-tetrakis(2-hydroxyethyl)1,6-hexanediamine tetraacetate.

*Example 10*

The procedure in Example 1 was repeated to produce N,N,N',N' - tetrakis(2 - hydroxyethyl)1,6-hexanediamine tetrapropionate.

*Example 11*

The procedure in Example 1 was repeated to produce N,N,N',N' - tetrakis(2 - hydroxyethyl)1,6-hexanediamine tetrabutyrate.

*Example 12*

0.18 g. of N,N,N',N'-tetrakis(2-hydroxyethyl)ethylenediamine tetraacetate obtained by the process of Example 1 was mixed with 3.6 g. of a 50% aqueous urea-formaldehyde syrup resin and 0.27 g. of a nonammonium stable organic salt curing catalyst (i.e. Catalyst AC). The mixture was cast on a glass plate with the aid of a drawdown bar, air dried overnight, and baked in an oven at 150° C. for 10 minutes to produce a clear, very flexible film with no tackiness or exudation.

*Example 13*

A film was prepared as in Example 12 using 0.72 g. of N,N,N',N' - tetrakis(2 - hydroxyethyl)ethylenediamine tetraacetate to give essentially equivalent results.

*Example 14*

A film was cast repeating the procedure of Example 12, substituting for the urea-formaldehyde resin, 2.0 g. of an 80% aqueous methylolated melamine resin to produce a clear film with no tackiness or exuding.

*Example 15*

A film was cast using a mixture of 0.18 g. of N,N,N', N",N" - penta(2-hydroxyethyl)diethylenetriamine pentaacetate, 3.6 g. of a 50% aqueous urea-formaldehyde syrup resin, 0.27 g. of the nonammonium stable organic salt catalyst used in Example 12 and 0.18 g. of a water dispersible titanium dioxide pigment. The film was flexible and dry, with no evidence of tackiness.

Example 16

Films were cast repeating the procedure of Example 12 but substituting the compounds described in Examples 2–11 for the plasticizer of Example 12, with essentially equivalent results.

Example 17

The procedure of Example 14 was repeated by substituting the compounds described in Example 2–11 for the plasticizer of Example 14 with identical results.

Example 18

Films were cast using the procedure of Example 15, except that the compounds described in Examples 2–11 were individually substituted for the plasticizer of Example 15 with excellent results.

It will be appreciated that various modifications may be made in the invention as described above without departing from the scope and spirit thereof. Thus, for example, it will be apparent that the urea-formaldehyde or melamine-formaldehyde resin may be used in different concentrations from those shown above. Additionally, in lieu of separate drying and baking steps, it may be desirable in some instances to bake the plasticized films directly thus eliminating the drying time. The plasticized compositions may also be made into forms other than films where flexible urea-formaldehyde or melamine-formaldehyde resins are desirable. Accordingly, the scope of the invention is defined in the following claims wherein:

We claim:

1. A composition comprising a formaldehyde resin selected from the group consisting of urea-formaldehyde and melamine-formaldehyde resins and, as a plasticizer therefor, a compound selected from the group consisting of compounds having the formula:

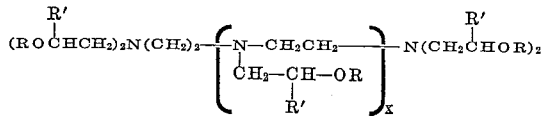

and compounds having the formula:

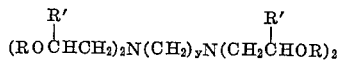

wherein R is an aliphatic acyl radical represented by R"CO—, R" being an alkyl radical which contains from one to three carbon atoms; R' is hydrogen, y has a value from 2 to 6 and x has a value from 1 to 3.

2. The composition of claim 1 wherein said resin is heat-curable.
3. The composition of claim 1 wherein said resin is heat-cured.
4. The composition of claim 1 wherein said resin is a water-soluble prepolymer.
5. The composition of claim 1 wherein said resin is a water-soluble prepolymeric syrup.
6. The composition of claim 1 containing from 1 to 50% by weight of said plasticizer, based on the weight of said plasticized composition.
7. The composition of claim 1 in the form of a cured resin.
8. The process which comprises forming a film from the composition of claim 1 in water and removing the water therefrom by heating to obtain a flexible, water-resistant film.
9. The process of claim 8 wherein said resin is a water-soluble prepolymeric urea-formaldehyde syrup and said film is obtained by casting an aqueous mixture of said syrup and plasticizer and then baking.
10. A composition comprising an aqueous solution of a water-soluble urea-formaldehyde prepolymer and at least one plasticizer selected from the group consisting of compounds having the formula:

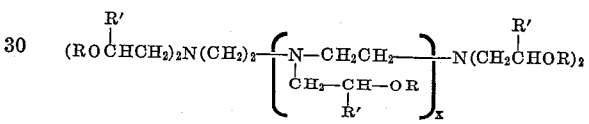

and compounds having the formula:

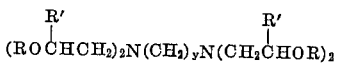

wherein R is an aliphatic acyl radical represented by R"CO—, R" being an alkyl radical which contains from one to three carbon atoms; R' is hydrogen, y has a value from 2 to 6 and x has a value from 1 to 3.

11. A composition comprising an aqueous solution of urea-formaldehyde prepolymer and, as a water-soluble plasticizer therefor, N,N,N',N'-tetrakis(2-hydroxyethyl) ethylenediamine tetraacetate.

References Cited in the file of this patent

UNITED STATES PATENTS

| | | |
|---|---|---|
| 2,044,612 | Jaeger | June 16, 1936 |
| 2,322,240 | Kropa | June 22, 1943 |
| 2,874,138 | Jackson | Feb. 17, 1959 |
| 2,937,966 | Updegraff et al. | May 24, 1960 |